United States Patent
Chang et al.

(10) Patent No.: US 8,643,728 B2
(45) Date of Patent: Feb. 4, 2014

(54) DIGITAL PHOTOGRAPHING DEVICE, METHOD OF CONTROLLING THE DIGITAL PHOTOGRAPHING DEVICE, AND COMPUTER-READABLE STORAGE MEDIUM FOR DETERMINING PHOTOGRAPHING SETTINGS BASED ON IMAGE OBJECT MOTION

(75) Inventors: Soon-keun Chang, Suwon-si (KR); Eun-sun Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 799 days.

(21) Appl. No.: 12/720,904

(22) Filed: Mar. 10, 2010

(65) Prior Publication Data

US 2010/0245600 A1    Sep. 30, 2010

(30) Foreign Application Priority Data

Mar. 30, 2009    (KR) .................. 10-2009-0026949

(51) Int. Cl.
*H04N 5/228* (2006.01)

(52) U.S. Cl.
USPC .................... 348/208.1; 348/208.4; 348/363; 348/364

(58) Field of Classification Search
USPC ...................................................... 348/208.4
See application file for complete search history.

(56) References Cited

U.S. PATENT DOCUMENTS

| 6,298,144 B1 * | 10/2001 | Pucker et al. ............... 382/103 |
| 8,237,803 B2 * | 8/2012 | Yumiki ..................... 348/208.4 |
| 2005/0134745 A1 * | 6/2005 | Bacche et al. .............. 348/702 |
| 2009/0102935 A1 * | 4/2009 | Hung et al. ............... 348/222.1 |

FOREIGN PATENT DOCUMENTS

WO    WO 2009008164 A1 *    1/2009    ............ G03B 5/00

* cited by examiner

*Primary Examiner* — Roberto Velez
*Assistant Examiner* — Cynthia Segura
(74) *Attorney, Agent, or Firm* — Drinker Biddle & Reath LLP

(57) ABSTRACT

Provided is a method of controlling a digital photographing device, the method including: removing high-frequency components from a first input image and a second input image; calculating a differential image between the first input image and the second input image from which the high-frequency components are removed; calculating the frequency of each of the pixel values of the differential image; determining at lease one pixel value of the differential image having a frequency greater than a frequency threshold as a target motion range among the pixel values of the differential image greater than a motion threshold; and determining photographing settings corresponding to the target motion range.

24 Claims, 12 Drawing Sheets

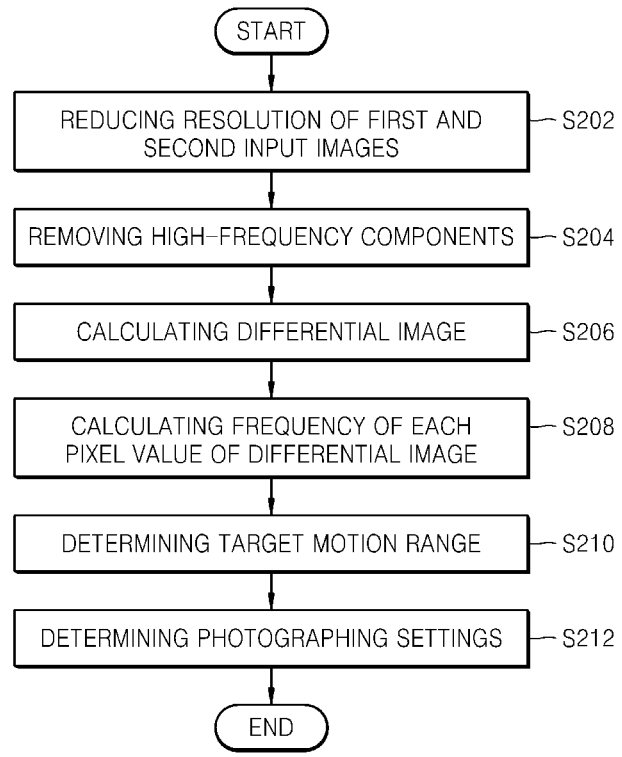
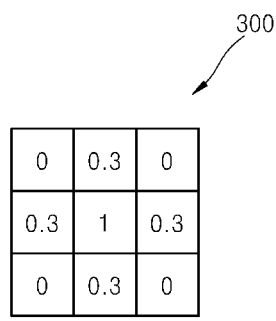

INPUT IMAGE

| $x_{11}$ | $x_{12}$ | $x_{13}$ |
|---|---|---|
| $x_{21}$ | $x_{22}$ | $x_{23}$ |
| $x_{31}$ | $x_{32}$ | $x_{33}$ |

LPF

| 0 | 0.3 | 0 |
|---|---|---|
| 0.3 | 1 | 0.3 |
| 0 | 0.3 | 0 |

→ $y = (x_{11} + x_{13} + x_{31} + x_{33}) \times 0 + (x_{12} + x_{21} + x_{23} + x_{32}) \times 0.3 + x_{22} \times 1$

| TARGET MOTION RANGE | SHUTTER SPEED (sec) | SUPPORTABILITY |
|---|---|---|
| 16 ~ 50 | 1 | SUPPORTABLE |
| 50 ~ 100 | 1/30 | SUPPORTABLE |
| ⋮ | ⋮ | ⋮ |
| 150 ~ 200 | 1/2000 | SUPPORTABLE |
| 200 ~ 256 | 1/4000 | NON-SUPPORTABLE |

DIGITAL PHOTOGRAPHING DEVICE, METHOD OF CONTROLLING THE DIGITAL PHOTOGRAPHING DEVICE, AND COMPUTER-READABLE STORAGE MEDIUM FOR DETERMINING PHOTOGRAPHING SETTINGS BASED ON IMAGE OBJECT MOTION

CROSS-REFERENCE TO RELATED PATENT APPLICATION

This application claims the benefit of Korean Patent Application No. 10-2009-0026949, filed on Mar. 30, 2009, in the Korean Intellectual Property Office, the disclosure of which is incorporated herein in its entirety by reference.

BACKGROUND

The present invention relates to a digital photographing device, a method of controlling the digital photographing device, and a computer-readable storage medium storing a computer program that controls the digital photographing device.

Automatic photographing functions that provide high-quality images, in which photographing settings are not set by a user but automatically calculated, have been widely used in digital photographing devices. For this, a variety of algorithms to automatically calculate photographing settings have been developed.

When photographing settings for the automatic photographing are set, the degree of motion of a subject may be considered. When a moving subject is photographed, the subject may appear blurry in a created image file, and thus an exposure time is reduced. However, the amount of light is reduced due to the reduced exposure time, and thus sensitivity of an image pickup device may be increased. Thus, a digital photographing device may determine shutter speed and/or sensitivity of an image pickup device according to the degree of motion of the subject.

The shutter speed is a value determining an exposure time of an image pickup device, and may be set by time units. As the shutter speed decreases, the exposure time of the image pickup device decreases, and the amount of light incident onto the image pickup device decreases.

The sensitivity of the image pickup device is a value representing the degree of amplification of an electrical signal generated by the incident light by the image pickup device. The sensitivity of the image pickup device may be set using, for example, an ISO value. As the ISO value increases, the sensitivity of the image pickup device increases, and thus the subject may be photographed using a small amount of light. However, since overly sensitive photographing amplifies not only the signal generated by the incident light but also noise, image quality may be deteriorated.

A motion vector may be used to detect the degree of motion of a subject. The motion vector represents the motion of the subject according to time as a vector based on a block unit. Using the motion vector, the degree of motion of the subject may be estimated. For example, if motion vectors of each of the blocks are zero, it is estimated that there is no motion. If motion vectors of all blocks move in the same direction, it is estimated that the body of the digital photographing device is moving. In addition, if motion vectors of several blocks are large, it is estimated that a portion of the image is moving.

However, since the estimation of the degree of motion using the motion vector is based on block units, the photographing settings may not be precisely controlled. Furthermore, while the motion vector exhibits high reliability for edges, the motion vector cannot accurately show the degree of motion of the subject on edge-free portions, for example, on a desk, the floor, the ground, a wall, etc. As a result, overly sensitive photographing may be performed by calculating the degree of motion of the subject higher than that of the real motion, or the subject may appear blurry in a created image file by calculating the degree of motion of the subject lower than that of the real motion.

SUMMARY

The present invention provides a method of controlling photographing settings by calculating the degree of motion of a subject using a pixel unit operation.

The present invention also provides a method of determining a motion generated by a shaking of a body of a digital photographing device as not being a motion of a subject when images are analyzed.

The present invention also provides a method of determining the degree of supportable motion by a digital photographing device.

According to an aspect of the present invention, there is provided a method of controlling a digital photographing device, the method including: removing high-frequency components from a first input image and a second input image; calculating a differential image between the first input image and the second input image from which the high-frequency components are removed; calculating the frequency of each of the pixel values of the differential image; determining at least one pixel value of the differential image having a frequency greater than a frequency threshold as a target motion range among the pixel values of the differential image greater than a motion threshold; and determining photographing settings corresponding to the target motion range. The method may further include reducing resolution of the first input image and the second input image before removing the high-frequency components.

The method may further include, before determining the photographing settings, determining whether the target motion range is within a range supported by the digital photographing device; and redetermining the target motion range from pixel values of the differential image within the range supported by the digital photographing device if the target motion range is not within the range supported by the digital photographing device, The first input image and the second input image may represent luminance values of input images. The first input image and the second input image may be two frames of live view input images, respectively, before being captured.

The method may further include: calculating a sum of the frequencies of pixel values of the differential image in a pixel value range with respect to each of a plurality of pixel value ranges greater than the motion threshold, wherein the target motion range is at least one pixel value range having the sum of frequencies greater than the frequency threshold.

If the number of the target motion range is more than two, the determining the target motion range may be performed by determining the greatest pixel values of the differential image as the target motion range. The photographing settings may include at least one selected from the group consisting of shutter speed and sensitivity of an image pickup device.

According to another aspect of the present invention, there is provided a digital photographing device including: a high-frequency component removing unit that removes high-frequency components from a first input image and a second input image; a differential image calculating unit that calculates differential images between the first input image and the second input image which are output from the high-frequency component removing unit; a differential image analyzing unit that calculates the frequency of each of the pixel values of the differential images; a target motion range determining unit that determines at least one pixel value of the differential image having a frequency greater than a frequency threshold as a target motion range among the pixel values of the differential image greater than a motion threshold; and a photographing setting determining unit that determines photographing settings corresponding to the target motion range. The digital photographing device may further include: a resolution reducing unit that reduces resolution of the first input image and the second input image, and wherein the first input image and the second input image which are input into the high-frequency component removing unit are prepared by reducing the resolution of the first input image and the second input image in the resolution reducing unit.

According to another aspect of the present invention, there is provided a computer-readable storage medium having embodied thereon a computer program including: a code programmed to remove high-frequency components from a first input image and a second input image; a code programmed to calculate a differential image between the first input image and the second input image from which the high-frequency components are removed; a code programmed to calculate the frequency of each of the pixel values of the differential image; a code programmed to determine at least one pixel value of the differential image having a frequency greater than a frequency threshold as a target motion range among the pixel value of the differential image greater than a motion threshold; and a code programmed to determine photographing settings corresponding to the target motion range.

The computer-readable storage medium may further include a code programmed to reduce resolution of the first input image and the second input image before removing the high-frequency components.

According to the present invention, photographing settings may be accurately controlled by calculating the degree of motion of a subject using a pixel unit calculation using luminance-based differential image analysis.

In addition, the motion caused by the shaking of the body of the digital photographing device is not determined as the motion of the subject by removing high-frequency components when an input image is analyzed. Accordingly, overly sensitive photographing, such as reducing an exposure time and increasing sensitivity of an image pickup device, may be prevented.

Furthermore, if the determined target motion range cannot be supported by the digital photographing device, photographing settings are redetermined. Thus, it is possible to ensure that photographing settings are supported by the digital photographing device.

BRIEF DESCRIPTION OF THE DRAWINGS

The above and other features and advantages of the present invention will become more apparent by describing in detail exemplary embodiments thereof with reference to the attached drawings in which:

FIG. 2 is a flowchart illustrating a method of controlling a digital photographing device, according to an embodiment of the present invention;

FIGS. 3A to 3C are graphical diagrams illustrating a process of applying a low pass filter to an input image;

DETAILED DESCRIPTION OF THE EMBODIMENTS

The present invention will now be described more fully with reference to the accompanying drawings, in which exemplary embodiments of the invention are shown. The following description and the attached drawings are provided for better understanding of the invention, and description of techniques or structures related to the present invention which would have been obvious to one of ordinary skill in the art may be omitted.

The exemplary embodiments should be considered in a descriptive sense only and not for purposes of limitation. Therefore, the scope of the invention is defined not by the detailed description of the invention but by the appended claims. The terms and words which are used in the present specification and the appended claims should not be construed as being confined to common meanings or dictionary meanings but be construed as meanings and concepts matching with the technical spirit of the present invention in order to describe the present invention in the best fashion.

The present invention will now be described more fully with reference to the accompanying drawings, in which the exemplary embodiments of the invention are shown.

Figure 1:
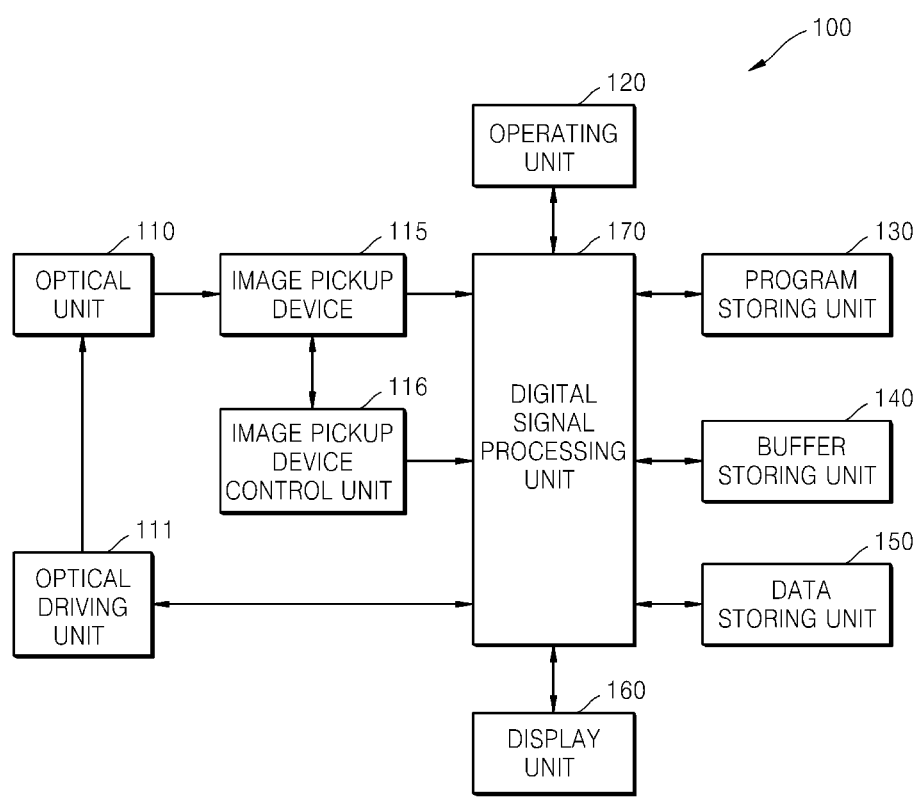
FIG. 1 is a block diagram of a digital photographing device according to an embodiment of the present invention.

FIG. 1 is a block diagram of a digital photographing device 100 according to an embodiment of the present invention.

Referring to FIG. 1, the digital photographing device 100 may include an optical unit 110, an optical driving unit 111, an image pickup device 115, an image pickup device control unit 116, an operating unit 120, a program storing unit 130, a buffer storing unit 140, a data storing unit 150, a display unit 160, and a digital signal processing (DSP) unit 170.

The optical unit 110 provides an optical signal input from a subject to the image pickup device 115. The optical unit 110 may include at least one of a zoom lens varying the angle of view according to a focal length and a focus lens focusing the subject. The optical unit 110 may further include an aperture adjusting the amount of light.

The optical driving unit 111 determines the position of the lenses of the optical unit 110 and whether the aperture is opened or closed. The optical driving unit 111 may focus by moving the focus lens, and may adjust the amount of light by determining whether the aperture is opened or closed. The optical driving unit 111 may control the optical unit 110 according to a control signal that is automatically generated from an image signal that is input in real time, or according to a control signal that is manually input by a user.

The optical signal transmitted through the optical unit 110 forms an image of the subject on a light-receiving surface of the image pickup device 115. The image pickup device 115 may be a charge-coupled device (CCD) or a complementary metal-oxide semiconductor image sensor (CIS), which converts the optical signal into an electrical signal. The image pickup device control unit 116 may control the sensitivity of the image pickup device 115. The image pickup device control unit 116 may control the image pickup device 115 according to the control signal that is automatically generated from the image signal that is input in real time, or according to the control signal that is manually input by the user.

The manipulation unit 120 may input an external control signal, for example, a control signal entered by the user. The manipulation unit 120 includes buttons having various functions, such as a shutter-release button to input a shutter-release signal which exposes the image pickup device 115 to light for a predetermined period of time to take a picture, a power button to supply power, a wide angle-zoom button and a telephoto-zoom button to widen or narrow the angle of view according to an input, a mode button to select a text input mode, a picture mode, or a play mode, a white balance button, and an exposure lock button. However, the manipulation unit 120 is not limited thereto, and may be, e.g., a keyboard, a touchpad, a touchscreen, or a remote control, as long as the manipulation unit 120 is used as an input device.

The digital photographing device 100 further includes, a program storing unit 130 storing a program, such as an operating system driving the digital photographing device 100, and an application system, the buffer storing unit 140 temporarily storing data necessary for computing or data resulting from the computing, and a data storing unit 150 storing various pieces of information necessary for the program including an image file containing an image signal.

The digital photographing device 100 includes the display unit 160 displaying the operating state of the digital photographing device 100, or information about an image captured by the digital photographing device 100. The display unit 160 may provide visual information and/or auditory information to the user. The display unit 160 for providing visual information may be a liquid crystal display (LCD) panel, an organic light-emitting display (OLED) panel, etc.

The digital photographing device 100 includes the DSP unit 170 that processes an input image signal and controls each element of the digital photographing device 100 according to the input image signal or an externally input signal.

FIG. 2 is a flowchart illustrating a method of controlling a digital photographing device according to an embodiment of the present invention.

A differential image between a first input image and a second input image is calculated, a target motion range is determined according to the differential image, and photographing settings are determined according to the target motion range. High-frequency components of the first input image and the second input image are removed before calculating the differential image between the first input image and the second input image.

Resolution of the first input image and the second input image is reduced (S202). In this regard, the first input image and the second input image are images formed by processing signals obtained by an image pickup device of the digital photographing device. The first input image and the second input image indicate two frames before being captured. The first input image and the second input image may preferably include only luminance components of two frames before being captured. For example, a Y component, i.e., a luminance component, in the Y, Cb, and Cr coordinate system, may be used.

When the resolution of the first input image and the second input image is reduced, high-frequency components of the first input image and the second input image are removed (S204).

Figures 3B, 3C:
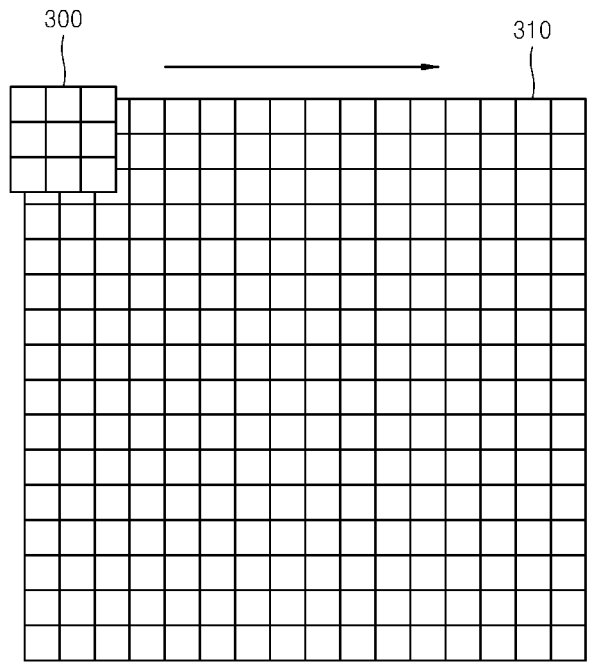

FIGS. 3A to 3C illustrates a process of applying a low pass filter 300 to an input image 310.

The high-frequency component may be removed using various low pass filters. FIG. 3A illustrates a low pass filter applicable to images. According to the method of controlling the digital photographing device, the low pass filter 300 is applied to a block of pixels of the input image 310 to remove high-frequency components as shown in FIG. 3B. In FIG. 3A, values in the low pass filter 300 represent weights respectively applied to the block of the pixels. When the low pass filter 300 is applied to the block of the pixels, a pixel ($x_{22}$) is disposed at the center of the low pass filter 300, and weights of the low pass filter 300 are applied to the pixel ($x_{22}$) and its peripheral pixels as shown in FIG. 3C, and then the pixel ($x_{22}$) and its peripheral pixels are linearly coupled to remove the high-frequency components from the first input image and the second input image.

By removing the high-frequency components, noise may be removed from the first input image and the second input image. Furthermore, by removing the high-frequency components, motion components caused by shaking of the body of the digital photographing device may be removed from the first input image and the second input image. If the photographing settings are determined such that the shaking of the body of the digital photographing device is considered as a motion of the subject, overly sensitive photographing is performed, thereby increasing noise. According to an embodiment of the present invention, however, the motion components caused by the shaking of the body of the digital photographing device are removed by removing the high-frequency components, and thus overly sensitive photographing does not occur.

As described above, resolution is reduced before removing the high-frequency components from the first input image and the second input image. In general, the size of a unit block of a low pass filter applied to images required to obtain optimized performance increases as the resolution of an input image increases. For example, in a resolution of 640×480 pixels, which is a commonly used video graphics array (VGA) resolution in the digital photographing device, a low pass filter having a size of 11×11 pixels may be used to optimize the performance of the digital photographing device. However, as the size of the low pass filter increases, the time period required for the low filter operation increases. According to the method of controlling the digital photographing device of the present embodiment, the size of the unit block of the low pass filter is reduced by decreasing resolution before removing the high-frequency components from the first input image and the second input image for an optimized performance, and thus the time period required to remove the high-frequency components is reduced.

When the high-frequency components are removed from the first input image and the second input image, a differential image between the first input image and the second input image is calculated (S206).

Figure 4:
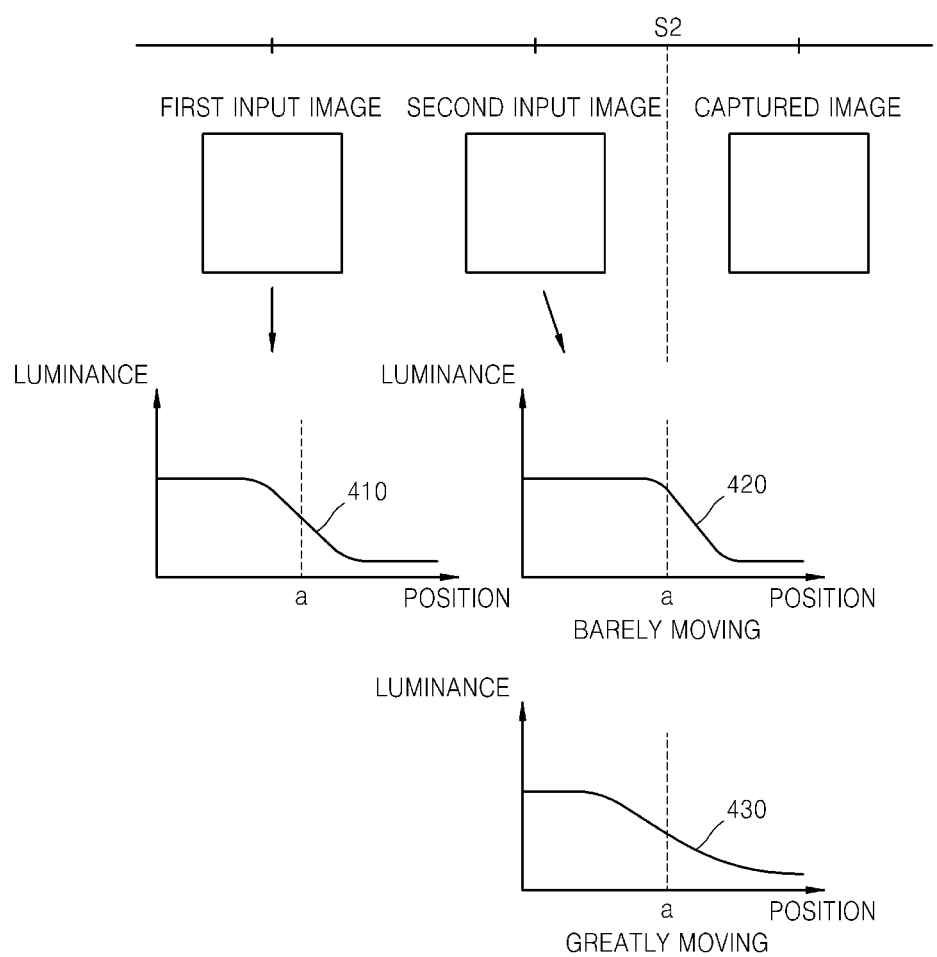
FIG. 4 are graphs illustrating a process of calculating a differential image, according to an embodiment of the present invention.

FIG. 4 illustrates a process of calculating a differential image, according to an embodiment of the present invention.

Referring to FIG. 4, the first input image and the second input image are two frames, respectively, before being captured. Since high-frequency components are removed from the first input image and the second input image, a slope of a pixel value change with respect to location at edges (a) may decrease as shown in curves 410, 420, and 430 of FIG. 4. Thus, motion components caused by the shaking of the body of the digital photographing device is removed.

If a subject moves between the first input image and the second input image, a pixel value of a motion region is changed, and thus the differential image may represent information on the motion of the subject.

The curves 410, 420, and 430 of FIG. 4 show luminance values with respect to locations of the first input image and the second input image from which the high-frequency components are removed. The curve 410 shows luminance values with respect to locations of the first input image from which the high-frequency components are removed. The curve 420 shows luminance values with respect to locations of the second input image from which the high-frequency components are removed if the subject barely moves. The curve 430 shows luminance values with respect to locations of the second input image from which the high-frequency components are removed if the subject greatly moves. When the curve 410 is compared with the curves 420 and 430, the pixel values of the differential image between the first input image and the second input image decreases if the subject barely moves, and the pixel values of the differential image between the first input image and the second input image increases if the subject greatly moves. Thus, the pixel values of the differential image represents information on the motion between the first input image and the second input image.

When the differential image is calculated, the frequency of each of the pixel values of the differential image is calculated (S208). The frequency of each of the pixel values of the differential image may be shown as a histogram illustrated in FIG. 5.

Then, a target motion range is determined by analyzing the frequencies of the pixel values of the differential image (S210). The process of determining the target motion range is described with reference to FIG. 5.

Figure 5:
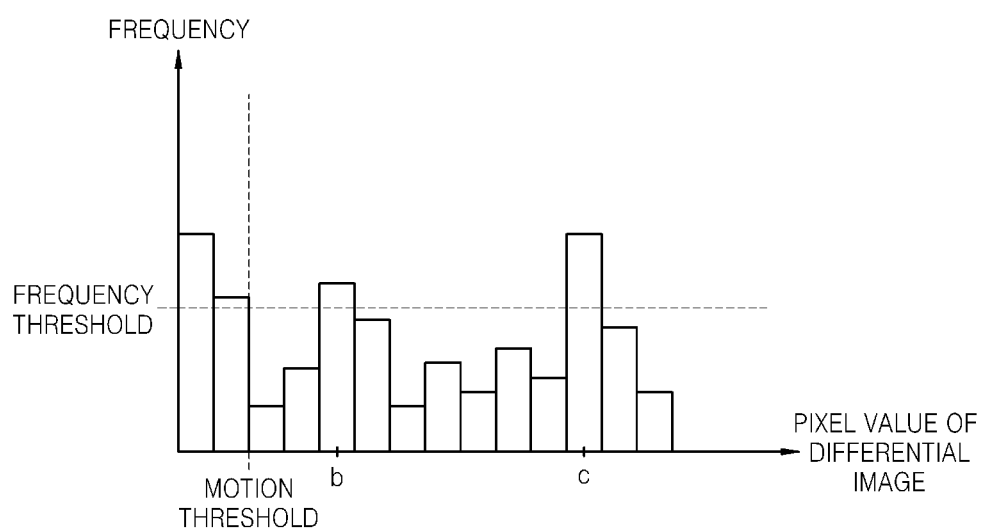
FIG. 5 is a histogram illustrating the frequency of each of pixel values of the pixel values of differential images.

FIG. 5 is the histogram illustrating frequencies of pixel values of the differential image.

According to the present embodiment, pixel values of the differential image that are less than a motion threshold are not considered to determine the target motion range. Since the target motion range is determined without considering the pixel values of the differential image that is less than the motion threshold, fine motions may not be considered to determine photographing settings. In particular, the shaking of the body of the digital photographing device may not be considered as the motion of the subject. Since a fine motion such as the shaking of the body of the digital photographing device causes a small difference value, a pixel value of the differential image caused by the shaking of the body of the digital photographing device cannot exceed the motion threshold. Thus, by only considering the pixel values of the differential image that is greater than the motion threshold, overly sensitive photographing, caused by reducing an exposure time and increasing sensitivity of an image pickup device since the shaking of the body of the digital photographing device is recognized as a motion of the subject, may be prevented.

According to the method of controlling the digital photographing device, among the pixel values of the differential image that are greater than the motion threshold, pixel values of the differential image having frequencies greater than a frequency threshold may be determined as the target motion range. If there are more than two pixel values of the differential image having a frequency greater than the frequency threshold, a pixel value of the differential image having the greatest frequency may be determined as the target motion range. For example, between the pixel values of the differential image b and c having frequencies greater than the frequency threshold in FIG. 5, the pixel value of the differential image c may be determined as the target motion range.

When the target motion range is determined, photographing settings are determined according to the target motion range (S212). For example, shutter speed and/or sensitivity of the image pickup device may be determined according to the target motion range.

Figure 6:
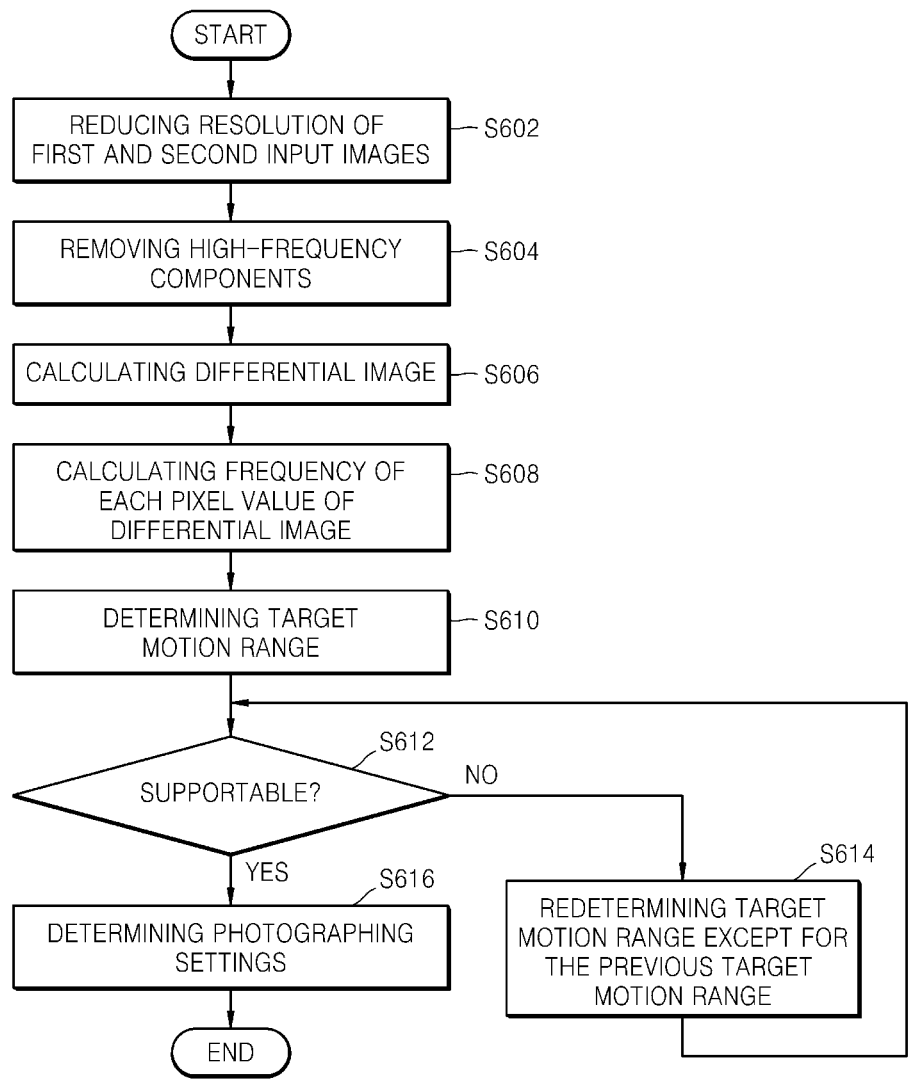
FIG. 6 is a flowchart illustrating a method of controlling a digital photographing device, according to another embodiment of the present invention.

FIG. 6 is a flowchart illustrating a method of controlling a digital photographing device, according to another embodiment of the present invention.

When a target motion range is determined, it is determined whether the target motion range is within a range supported by the digital photographing device. If the target motion range is not supported by the digital photographing device, the target motion range is redetermined (S612). Thus, it is possible to ensure that the target motion range is supported by the digital photographing device.

Operations S602, S604, S606, S608, and S610 of the method of controlling the digital photographing device according to the current embodiment are the same as operations S202, S204, S206, S208, and S210 of the method of FIG. 2, and thus they will not be described herein for convenience.

Figures 7, 8:
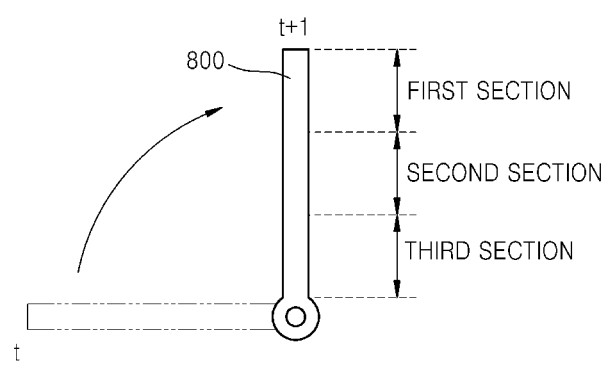
FIG. 7 is a table illustrating information on shutter speed and supportability according to pre-stored target motion ranges, according to an embodiment of the present invention.
FIG. 8 is a pictorial diagram illustrating a rotationally moving subject.

FIG. 7 illustrates information on shutter speed and supportability according to pre-stored target motion ranges, according to an embodiment of the present invention.

It is determined whether the determined target motion range is within a range supported by the digital photographing device using information on shutter speed and supportability according to pre-stored target motion ranges as shown in FIG. 7.

If the determined target motion range is not within the range supported by the digital photographing device (S612), the target motion range is redetermined from pixel values of the differential image, except for the pixel value of the differential image selected as the previous target motion range (S614). For this, the pixel values of the differential images selected as the previous target motion ranges may be stored.

Otherwise, if the determined target motion range is within a range supported by the digital photographing device (S612), photographing settings are determined according to the target motion range (S616). For example, the shutter speed may be determined according to the target motion range using pre-stored information as shown in FIG. 7.

Alternatively, if the target motion range is determined (S610), the pixel values of the differential image corresponding to an unsupportable target motion range may be excluded to determine the target motion range.

According to another embodiment of the invention, by determining whether the determined target motion range is supported by the digital photographing device, photographing settings may be efficiently and automatically calculated when a rotationally moving subject is photographed.

FIG. 8 illustrates a rotationally moving subject 800.

When the rotationally moving subject 800 is photographed, the amount of motion varies in each section of the rotationally moving subject 800 as shown in FIG. 8. As shown in FIG. 8, if the rotationally moving subject 800 rotates from position t to position t+1, the amount of motion may decrease as a section is closer to the center of the rotation, and the amount of motion may increase as a section is farter from the center of the rotation. Thus, if the degree of motion is represented as strong, moderate, and weak, a strong motion is found in a first section of the rotationally moving subject 800, a moderate motion is found in a second section of the rotationally moving subject 800, and a weak motion is found in a third section of the rotationally moving subject 800. The first section of the rotationally moving subject 800 has the largest area, the third section of the rotationally moving subject 800 has the second largest area, and the second section of the rotationally moving subject 800 has the smallest area in FIG. 8. Since the first section of the of the rotationally moving subject 800 has the strongest motion and the largest area, a pixel value of the differential image corresponding to the first section of the rotationally moving subject 800 will be determined as the target motion range. However, if the digital photographing device cannot support the determined target motion range, a pixel value of the differential image closest to the determined target motion range may be considered as the target motion range. However, the third section of the rotationally moving subject 800 has the second largest area. Thus, if a pixel values of the differential image corresponding to the third section of the rotationally moving subject 800 is determined as the target motion range, the quality of a captured image may be improved as compared when the pixel values of the differential image closest to the previous target motion range is determined as the target motion range. Thus, if the determined target motion range cannot be supported by the digital photographing device, the target motion range is redetermined. Therefore, a high-quality captured image may be obtained and the photographing settings corresponding to the target motion range supported by the digital photographing device may be obtained.

Figure 9:
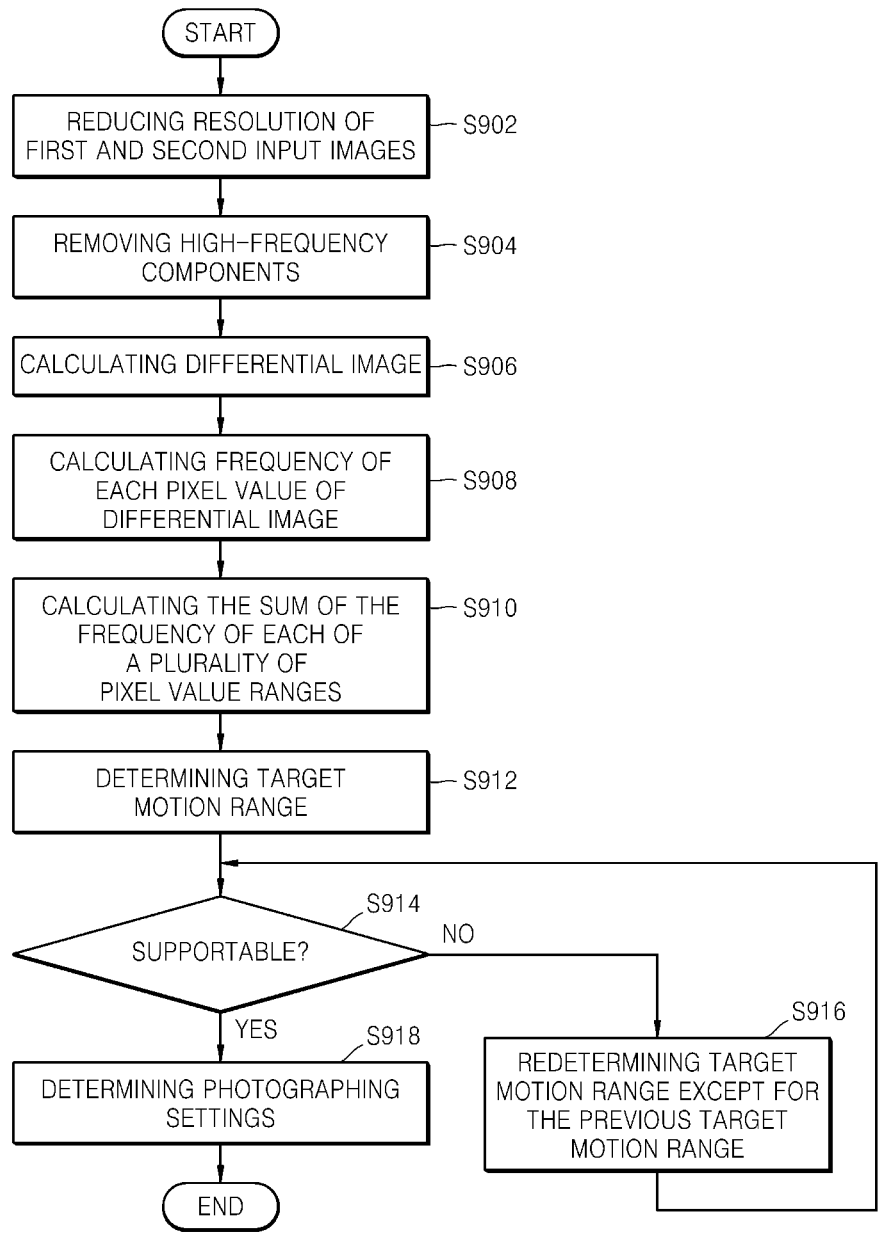
FIG. 9 is a flowchart illustrating a method of controlling a digital photographing device, according to another embodiment of the present invention.

FIG. 9 is a flowchart illustrating a method of controlling a digital photographing device, according to another embodiment of the present invention.

A plurality of pixel value ranges are defined, frequencies of the plurality of pixel value ranges is calculated, and at least one of the pixel value ranges is determined as the target motion range. The plurality of the pixel value ranges may be predefined.

Operations S902, S904, S906, and S908 of the method of controlling the digital photographing device according to the current embodiment are the same as operations S202, S204, S206, S208, and S210 of the method of FIG. 2, and thus they will not be described herein for convenience.

When the frequency of each of the pixel values of the differential image is calculated (S908), the sum of the frequencies of the pixel values belonging to a pixel value range with respect to each of the plurality of the pixel value ranges is calculated (S910).

When the frequency of each of the pixel value ranges is calculated, a target motion range is determined among the plurality of pixel value ranges (S912).

Figure 10:
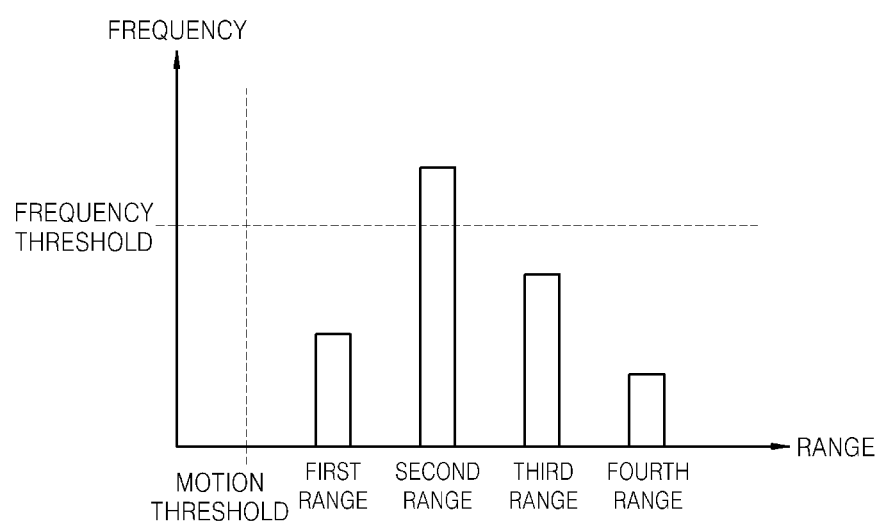
FIG. 10 is a histogram illustrating the frequency of the plurality of pixel values ranges for differential images.

FIG. 10 is a histogram illustrating the frequencies of the plurality of pixel value ranges.

The plurality of pixel value ranges may be defined to be greater than the motion threshold. Among the plurality of pixel value ranges, a pixel value range having a frequency greater than the frequency threshold may be defined as the target motion range. In addition, if there are more than two pixel value ranges having frequencies greater than the frequency threshold, the pixel value range having the greatest frequency may be determined as the target motion range. In FIG. 10, the second pixel value range has a frequency greater than the frequency threshold, and thus is determined as the target motion range.

When the target motion range is determined (S912), it is determined whether the target motion range is within a range supported by the digital photographing device (S914). In this regard, the information on the target motion range, as shown in FIG. 7, may be represented by information on the plurality of pixel value ranges.

If the determined target motion range is not supported by the digital photographing device (S914), the target motion range is redetermined from the plurality of pixel value ranges, except for the pixel value image selected as the previous target motion range (S916). For this, the pixel value range selected as the previous target motion range may be stored.

If the determined target motion range is supported by the digital photographing device (S914), photographing settings are determined according to the target motion range (S918). For example, the shutter speed may be determined according to the target motion range using information pre-stored as shown in FIG. 7.

Figure 11:
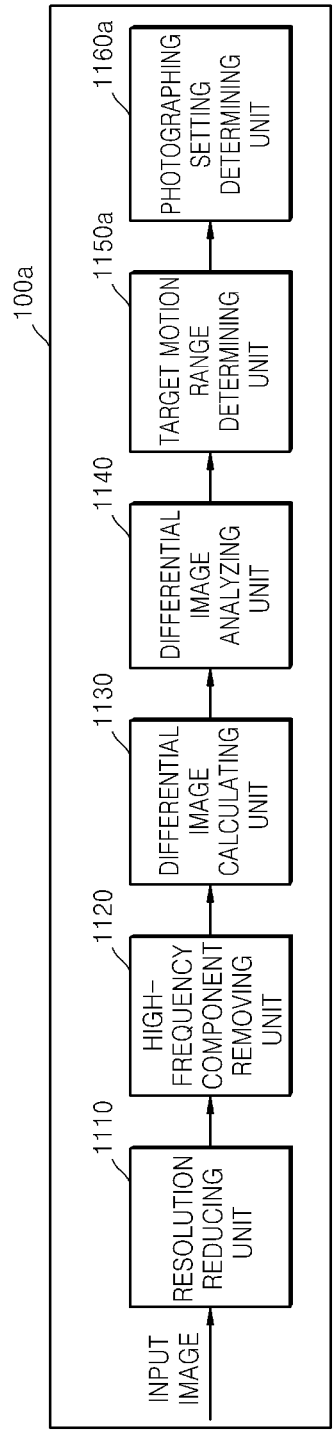
FIG. 11 is a block flow diagram illustrating the configuration of a digital photographing device according to an embodiment of the invention.

FIG. 11 illustrates the configuration of a digital photographing device 100a according to an embodiment of the invention.

The digital photographing device 100a may include a resolution reducing unit 1110, a high-frequency component removing unit 1120, a differential image calculating unit 1130, a differential image analyzing unit 1140, a target motion range determining unit 1150a, and a photographing setting determining unit 1160a.

The resolution reducing unit 1110 reduces resolution of a first input image and a second input image. In this regard, the first input image and the second input image, which are formed by processing a signal generated by an image pickup device of a digital photographing device, may be two frames, respectively, before being captured. The first input image and the second input image may preferably include only luminance components of the two frames before being captured. For example, a Y component, i.e., the luminance component, from Y, Cb, and Cr coordinates may be used.

Figure 12:
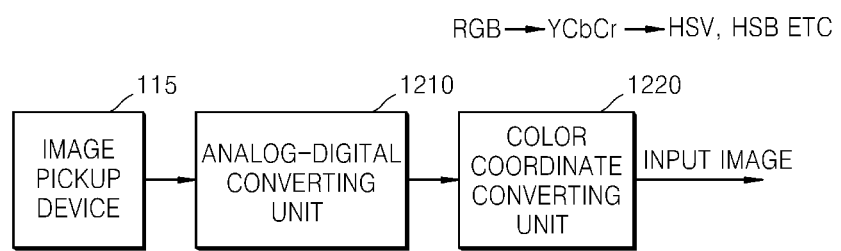
FIG. 12 is a block flow diagram illustrating a process of generating input images.

FIG. 12 illustrates a process of generating input images.

A first input image and a second input image may be generated by converting an analog electrical signal generated by the image pickup device 115 of the digital photographing device 100a into a digital signal, and converting the digital signal into predetermined color coordinates.

The image pickup device 115 may be an image sensor including a predetermined unit pixel, for example, a unit pixel including R, Gb, Gr, and B sub-pixels. If the image sensor converts incident light into an analog electrical signal, an analog-digital converting unit 1210 converts the analog electrical signal generated by the image pickup device 115 into a digital signal. Then, the digital signal generated by the image pickup device 115 is converted into predetermined color coordinates by a color coordinate converting unit 1220. For example, the signal generated by the image pickup device 115 is converted into an RGB signal, Y, Cb, and Cr signals, and then signals using hue-saturation-value (HSV) and hue-saturation-brightness (HSB) models.

The process of generating input images shown in FIG. 12 is an example, and the present invention is not limited thereto.

The high-frequency component removing unit 1120 removes high-frequency components from the first input image and the second input image. The high-frequency component removing unit 1120 may be configured using hardware, software, or a combination of the hardware and the software using a low pass filter. The operation of the high-frequency component removing unit 1120 has been described with reference to FIGS. 3A to 3C.

The differential image calculating unit 1130 calculates a differential image between the first input image and the second input image. The operation of the differential image calculating unit 1130 has been described with reference to FIG. 4.

The differential image analyzing unit 1140 calculates the frequency of each of the pixel values of the differential image. The frequencies (of the pixel values of the differential image may be calculated as shown by the histogram of FIG. 5.

The target motion range determining unit 1150*a* analyzes the frequency of each of the pixel values of the differential images to determine a target motion range. The operation of the target motion range determining unit 1150*a* has been described with reference to FIG. 5.

The photographing setting determining unit 1160*a* determines photographing settings according to the target motion range determined by the target motion range determining unit 1150*a*. For example, shutter speed and/or sensitivity of the image pickup device 115 may be determined according to the target motion range.

Figure 13:
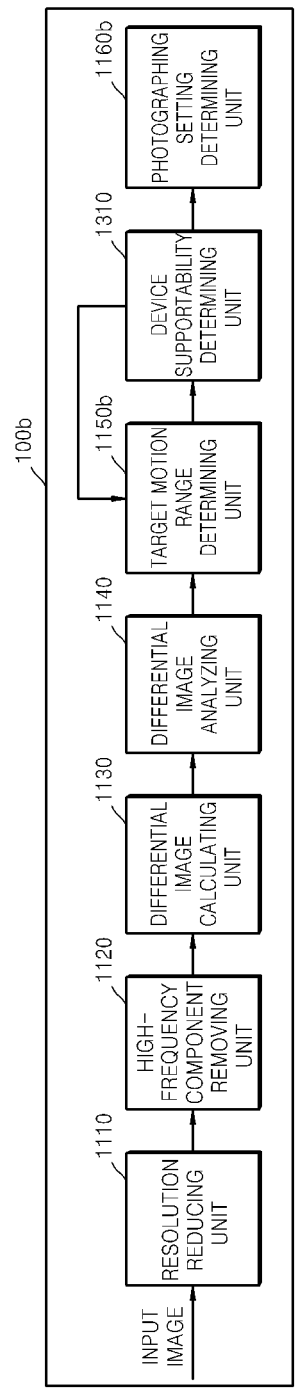
FIG. 13 is a block flow diagram illustrating the configuration of a digital photographing device according to another embodiment of the present invention.

FIG. 13 illustrates the configuration of a digital photographing device 100*b* according to another embodiment of the present invention.

The digital photographing device 100*b* may include a resolution reducing unit 1100, a high-frequency component removing unit 1120, a differential image calculating unit 1130, a differential image analyzing unit 1140, a target motion range determining unit 1150*b*, a device supportability determining unit 1310, and a photographing setting determining unit 1160*b*.

The resolution reducing unit 1100, the high-frequency component removing unit 1120, the differential image calculating unit 1130, and the differential image analyzing unit 1140 have been described with reference to FIG. 11.

The target motion range determining unit 1150*b* determines the target motion range by analyzing the frequency of each of the pixel values of the differential image. The target motion range determining unit 1150*b* may determine a pixel value of the differential image having a frequency greater than a frequency threshold, among pixel values of the differential image greater than a motion threshold, as the target motion range using the histogram shown in FIG. 5. In addition, when there are more than two pixel values of the differential image having a frequency greater than the frequency threshold, the target motion range determining unit 1150*b* may determine the pixel values of the differential image having the greatest frequency as the target motion range.

The device supportability determining unit 1310 determines whether the target motion range may be supported by the digital photographing device when the target motion range determining unit 1150*b* determines the target motion range. The device supportability determining unit 1310 may determine whether the target motion range may be supported by the digital photographing device using pre-stored information as shown in FIG. 7.

If device supportability determining unit 1310 determines that the target motion range cannot be supported by the digital photographing device, the target motion range determining unit 1150*b* redetermines the target motion range except for the pixel values of the differential image selected as the previous target motion range. For this, the target motion range determining unit 1150*b* may store the pixel values of the differential image selected as the previous target motion ranges.

The photographing setting determining unit 1160*b* determines photographing settings according to the target motion range determined by the target motion range determining unit 1150*b*, if the target motion range can be supported by the digital photographing device. For example, the photographing settings determining unit 1160*b* may determine shutter speed according to the target motion range using pre-stored information as shown in FIG. 7.

Alternatively, the target motion range determining unit 1150*b* may exclude pixel values of the differential image corresponding to target motion ranges which cannot be supported by the digital photographing device when determining the target motion range.

According to another embodiment, a plurality of pixel value ranges are defined, the frequencies of the plurality of the pixel value ranges is calculated, and at least one of the pixel value ranges is determined as the target motion range. The plurality of pixel value ranges may be predefined.

For this, when the differential image calculating unit 1130 calculates the frequency of each of the pixel values of the differential image, the differential image analyzing unit 1140 calculates the sum of the frequencies of the pixel values belonging to a pixel value range with respect to each of the plurality of the pixel value ranges. For example, the differential image analyzing unit 1140 may calculate the frequencies of the plurality of pixel value ranges as shown in FIG. 10.

The target motion range determining unit 1150*b* determines a pixel value range having a frequency greater than the frequency threshold as the target motion range. In addition, information on the target motion range may be represented as information on the plurality of pixel value ranges.

The elements of the embodiments of the present invention may be configured using hardware, software, or a combination of the hardware and the software. For example, the elements may be configured using executable computer code programmed to operate each element when executed in the digital signal processing unit 170 and stored in the program storing unit 130.

The present invention may be embodied as computer-readable code on a computer-readable storage medium. The computer-readable storage medium is any data storage device that can store data which can be thereafter read by a computer system.

The computer-readable code is configured to perform the operations of the method according to the present invention when being read and executed from the computer-readable storage medium by the digital signal processing unit 170. The computer-readable code may be realized with various programming languages. Functional programs, code, and code segments for embodying the present invention may be easily derived by programmers in the art to which the present invention belongs.

Examples of the computer-readable storage medium include read-only memories (ROMs), random-access memories (RAMs), CD-ROMs, magnetic tapes, floppy disks, and optical data storage devices. The computer-readable storage medium may be a carrier wave that transmits data via the Internet, for example. The computer-readable storage medium may be distributed among computer systems that are interconnected through a network, and the present invention may be stored and implemented as computer readable code in the distributed system.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A method of controlling a digital photographing device, the method comprising:
   removing high-frequency components from a first input image and a second input image;
   calculating, after removing the high-frequency components, a differential image between the first input image and the second input image from which the high-frequency components are removed;
   calculating a frequency of each of the pixel values of the differential image;
   determining at least one pixel value of the differential image having a frequency greater than a frequency threshold as a target motion range among the pixel values of the differential image greater than a motion threshold; and
   determining photographing settings corresponding to the target motion range.

2. The method of claim 1, further comprising reducing resolution of the first input image and the second input image before removing the high-frequency components.

3. The method of claim 1, further comprising:
   before determining the photographing settings, determining whether the target motion range is within a range supported by the digital photographing device; and
   redetermining the target motion range from pixel values of the differential image within the range supported by the digital photographing device if the target motion range is not within the range supported by the digital photographing device.

4. The method of claim 1, wherein the first input image and the second input image represent luminance values of input images.

5. The method of claim 1, wherein the first input image and the second input image are two frames of live view input images, respectively, before being captured.

6. The method of claim 1, further comprising:
   calculating a sum of the frequencies of pixel values of the differential image in a pixel value range with respect to each of a plurality of pixel value ranges greater than the motion threshold,
   wherein the target motion range is at least one pixel value range having the sum of frequencies greater than the frequency threshold.

7. The method of claim 1, wherein, if the number of the target motion range is more than two, the determining the target motion range is performed by determining the greatest pixel values of the differential image as the target motion range.

8. The method of claim 1, wherein the photographing settings comprise at least one selected from the group consisting of shutter speed and sensitivity of an image pickup device.

9. A digital photographing device comprising:
   a high-frequency component removing unit that removes high-frequency components from a first input image and a second input image;
   a differential image calculating unit that calculates, after the high-frequency components have been removed, differential images between the first input image and the second input image which are output from the high-frequency component removing unit;
   a differential image analyzing unit that calculates the frequency of each of the pixel values of the differential images;

a target motion range determining unit that determines at least one pixel value of the differential image having a frequency greater than a frequency threshold as a target motion range among the pixel values of the differential image greater than a motion threshold; and a photographing setting determining unit that determines photographing settings corresponding to the target motion range.

10. The digital photographing device of claim 9, further comprising:

a resolution reducing unit that reduces resolution of the first input image and the second input image, and wherein the first input image and the second input image which are input into the high-frequency component removing unit are prepared by reducing a resolution of the first input image and the second input image in the resolution reducing unit.

11. The digital photographing device of claim 9, further comprising:

a device supportability determining unit that determines whether the target motion range is within a range supported by the digital photographing device, wherein when the target motion range is not within the range supported by the digital photographing device, the target motion range determining unit redetermines the target motion range from pixel values of the differential image within the range supported by the digital photographing device.

12. The digital photographing device of claim 9, wherein the first input image and the second input image represent luminance values of the input images.

13. The digital photographing device of claim 9, wherein the first input image and the second input image are two frames of live view input images, respectively, before being captured.

14. The digital photographing device of claim 9, wherein the target motion range determining unit calculates the sum of frequencies of pixel values of the difference image in a pixel value range with respect to each of a plurality of pixel value ranges greater than a motion threshold, and determines at least one pixel value range having the sum of frequencies greater than the frequency threshold as the target motion range.

15. The digital photographing device of claim 9, wherein when the number of the target motion range is more than two, the target motion range determining unit determines the greatest pixel value of the differential image as the target motion range.

16. The digital photographing device of claim 9, wherein the photographing settings comprise at least one selected from the group consisting of shutter speed and sensitivity of an image pickup device.

17. A non-transitory computer-readable storage medium having embodied thereon a computer program comprising:

a code programmed to remove high-frequency components from a first input image and a second input image;

a code programmed to calculate, after the high-frequency components have been removed, a differential image between the first input image and the second input image from which the high-frequency components are removed;

a code programmed to calculate the frequency of each of the pixel values of the differential image;

a code programmed to determine at least one pixel value of the differential image having a frequency greater than a frequency threshold as a target motion range among the pixel value of the differential image greater than a motion threshold; and a code programmed to determine photographing settings corresponding to the target motion range.

18. The computer-readable storage medium of claim 17, further comprising a code programmed to reduce resolution of the first input image and the second input image before removing the high-frequency components.

19. The computer-readable storage medium of claim 17, wherein the computer program further comprises:

a code programmed to determine whether the target motion range is within a range supported by the digital photographing device before determining the photographing settings; and a code programmed to redetermine the target motion range from pixel values of the differential image within the range supported by the digital photographing device if the target motion range is not within the range supported by the digital photographing device.

20. The computer-readable storage medium of claim 17, wherein the first input image and the second input image represent luminance values of the input images.

21. The computer-readable storage medium of claim 17, wherein the first input image and the second input image are two frames of live view input images, respectively, before being captured.

22. The computer-readable storage medium of claim 17, wherein the computer program further comprises:

a code programmed to calculate a sum of frequencies of pixel values of the differential image in a pixel value range with respect to each of a plurality of pixel value ranges greater than the motion threshold, wherein the target motion range is at least one pixel value range having the sum of frequencies greater than the frequency threshold.

23. The computer-readable storage medium of claim 17, wherein if the number of the target motion range is more than two, the code programmed to determine the target motion range determines the greatest pixel value of the differential image as the target motion range.

24. The computer-readable storage medium of claim 17, wherein the photographing settings comprise at least one selected from the group consisting of shutter speed and sensitivity of an image pickup device.

* * * * *